United States Patent [19]

David

[11] 3,905,701

[45] Sept. 16, 1975

[54] METHOD AND DEVICE FOR ADJUSTING CONTRAST IN PHOTOGRAPHIC AND PHOTOMECHANICAL REPRODUCTION WORK

[75] Inventor: Michel David, Sceaux, France

[73] Assignee: Logabax Anoiennement Ateliers Bariquand & Marre, Paris, France

[22] Filed: Nov. 20, 1973

[21] Appl. No.: 417,514

Related U.S. Application Data

[63] Continuation-in-part of Ser. No. 246,534, April 24, 1972.

[30] Foreign Application Priority Data

Apr. 23, 1971  France .............................. 71.14563

[52] U.S. Cl. .................... 355/71; 355/77; 355/80; 354/44; 354/271; 352/91 R
[51] Int. Cl.² ......................................... G03B 27/78
[58] Field of Search ............ 355/71, 77, 80; 352/91; 354/44, 271

[56] References Cited
UNITED STATES PATENTS

| | | | |
|---|---|---|---|
| 3,528,737 | 9/1970 | Denner | 355/71 |
| 3,784,290 | 1/1974 | Strobel et al. | 352/91 |

FOREIGN PATENTS OR APPLICATIONS

| | | | |
|---|---|---|---|
| 1,111,894 | 5/1968 | United Kingdom | 355/71 |

Primary Examiner—Samuel S. Matthews
Assistant Examiner—Russell E. Adams, Jr.
Attorney, Agent, or Firm—Amster & Rothstein

[57] ABSTRACT

This invention relates to photographic and photomechanical reproduction work, of the black-and-white or colour process type, and specially to new methods and means for adjusting the contrast between the lights and shades of the image. Basically, the auxiliary or flash exposure and the main exposure are adjusted and effected simultaneously, whereby the amounts of light transmitted by the shades and by the lights, respectively, of the original document have well-defined values. This is obtained by providing, in a photographic reproduction apparatus, a lens assembly comprising, adjacent the variable-aperture opaque diaphragm, a further variable-aperture diaphragm consisting of translucent material. The two diaphragms may have their control levers operatively interconnected for manual operation, or said diaphragms may be automatically operated by means of two photometers disposed in the lights and in the shades, respectively, of the image to be reproduced.

5 Claims, 9 Drawing Figures

METHOD AND DEVICE FOR ADJUSTING CONTRAST IN PHOTOGRAPHIC AND PHOTOMECHANICAL REPRODUCTION WORK

This is a continuation in part of my application Ser. No. 246,534, filed Apr. 24, 1972.

FIELD OF THE INVENTION

The present invention relates to photography and photomechanical reproduction, and more specially to methods and means for adjusting contrast in photographic and photomechanical reproduction work.

DESCRIPTION OF THE PRIOR ART

In most photographic processes it is usual to adjust or preset the image contrast in order to reproduce the complete scale of densities appearing in the document to be reproduced, by effecting, in addition to the normal, so-called main exposure, an auxiliary or flash exposure providing a uniform illumination. This technique is currently used in photography for colour printing, and also in photomechanical reproduction processes for producing half-tone or continuous-tone negatives.

The auxiliary exposure is generally effected after the end of the main exposure, with the assistance of a separate light source (flash exposure auxiliary light source), consisting for example of a bulb or a luminescent screen, disposed either between the lens assembly of the photographic reproduction apparatus and the sensitive surface, or between the lens assembly and the document to be reproduced. Another technique consists in effecting the auxiliary exposure simultaneously with the main exposure, by using either means for transmitting and diffusing one fraction of the light emitted from the document, or a separate light source; in either case the auxiliary exposure light is transmitted or emitted as an annulus externally surrounding the optical beam issuing from the holder frame and passing through the lens assembly (cf. J. VAREINE, Pratique de la Selection des Couleurs, Editions Estienne, 1959, p. 55, Paris, France; and Printing Trade Journal, No. 999, May 1970, pp. 55–56).

Only this last mentioned method permits to properly proportion the main and auxiliary exposure amounts of light, which are emitted simultaneously during the single exposure time.

However, the prior art methods indicated hereinabove are objectionable in the following feature: the auxiliary exposure light beam does not coincide, even partially, with the optical beam for the main exposure, so that any accurate and uniform adjustment of the ratio of the diffused light, emitted from the auxiliary light source, to the light emitted from the document holder and received by the sensitive surface, is positively precluded.

It is also known, in photographic reproduction cameras, to use a lens assembly comprising a fixed aperture ring of translucent material, which is disposed near the variable aperture opaque diaphragm or iris of said lens assembly; the variable aperture of said opaque diaphragm is adjusted to be greater than the fixed aperture of the translucent ring.

The adjustment possibilities thus afforded are rather limited due to the fact that the aperture of the translucent ring has a fixed value.

SUMMARY OF THE INVENTION

A first object of the present invention is to provide means for effecting interrelated adjustments of the auxiliary exposure and the main exposure so that, on the projection plane, the amounts of light transmitted by the shades, on the one hand, and by the lights, on the other hand, of the document to be reproduced, have well-defined values.

A second object of the present invention is to provide a photographic reproduction apparatus, wherein the total light (i.e. the main exposure light and the auxiliary exposure light) passes only through the optical system of the reproduction apparatus.

Another object of the present invention consists in the provision of a lens assembly for a photographic reproduction apparatus or camera, comprising a mount and, in said mount, at least one projection lens, a first variable-aperture diaphragm of opaque material and a second variable-aperture diaphragm of translucent material, said first and second diaphragms being disposed tandemwise in said mount in the optical field of said lens, and first and second means disposed on said mount for adjusting from the exterior the apertures of said first and second diaphragms, respectively.

In a preferred embodiment of this lens assembly, said first and second diaphragm aperture adjustment means comprise first and second adjustment levers rotatably mounted in planes parallel to each other and substantially perpendicular to the lens axis, and means for operatively interconnecting said adjustment means comprises a coupling rod having one end pivotally connected to one of said first and second adjustment levers, means being also provided for connecting any selected point of said rod to the other ajustment lever.

The second variable-aperture translucent diaphragm whis is comprised in the lens assembly of this invention may be of the iris, gate or any other well known type.

The said second translucent diaphragm comprises parts of any suitable light-diffusing material, such as thin, rigid and translucent plastic material, thin translucent glass, stretched fabric, finely perforated metal sheet.

The lens assembly according to this invention may be used in enlargers and reproduction cameras for photographic reproduction processes of the continuous-tone or half-tone type, for black-and-white or colour reproduction, specially for preparing separation negatives.

A further object of the present invention is to provide a method of photographically reproducing an object, which comprises the following successive steps:

a. forming a luminous reproduction beam propagating from the object in a predetermined direction;

b. concentrating said light beam onto a plane surface disposed across said predetermined direction so as to form an image of said object thereon;

c. stopping the propagation of said light beam outside a first closed contour disposed across said predetermined direction, and encompassing a first predetermined area;

d. diffusing the portion of said light beam which passes between said first closed contour and a second closed contour, disposed internally of the first one and encompassing a second predetermined area;

e. varying simultaneously and in the same direction said first and second contour areas respectively;

f. measuring the illumination of the light areas of said object image;

g. varying only said first contour area;

h. measuring the illumination of the shade areas of said object image;

i. repeating steps (e) to (h) until the illuminations measured in the light and shade areas of the image have predetermined values.

j. photographing the image of said object.

A still further object of the present invention is to provide an installation for photographic reproduction work, comprising a reproduction apparatus equipped with a lens assembly having a first and a second variable-aperture diaphragm of opaque and translucent material, respectively, and further comprising a first and a second photometer, disposed in one light area and one shade area of the image of the object to be reproduced, respectively.

A first embodiment of this photographic reproduction installation further comprises first and second power members for actuating said first and second means for adjusting the lens assembly diaphragm aperture, and first and second hand switchable electric means for selectively energizing said first and second power members, respectively.

A second embodiment of this photographic reproduction apparatus further comprises electric means for energizing said first and second power members as long as the output signal of at least one of the first and second photometers departs from a predetermined value.

The installation according to this invention may also be used for measuring the diffused light.

BRIEF DESCRIPTION OF THE DRAWINGS

In order to afford a clearer understanding of this invention, a detailed description thereof will now be given by way of illustration with reference to the attached drawings, in which.

DESCRIPTION OF THE PREFERRED EMBODIMENTS

Figure 1:
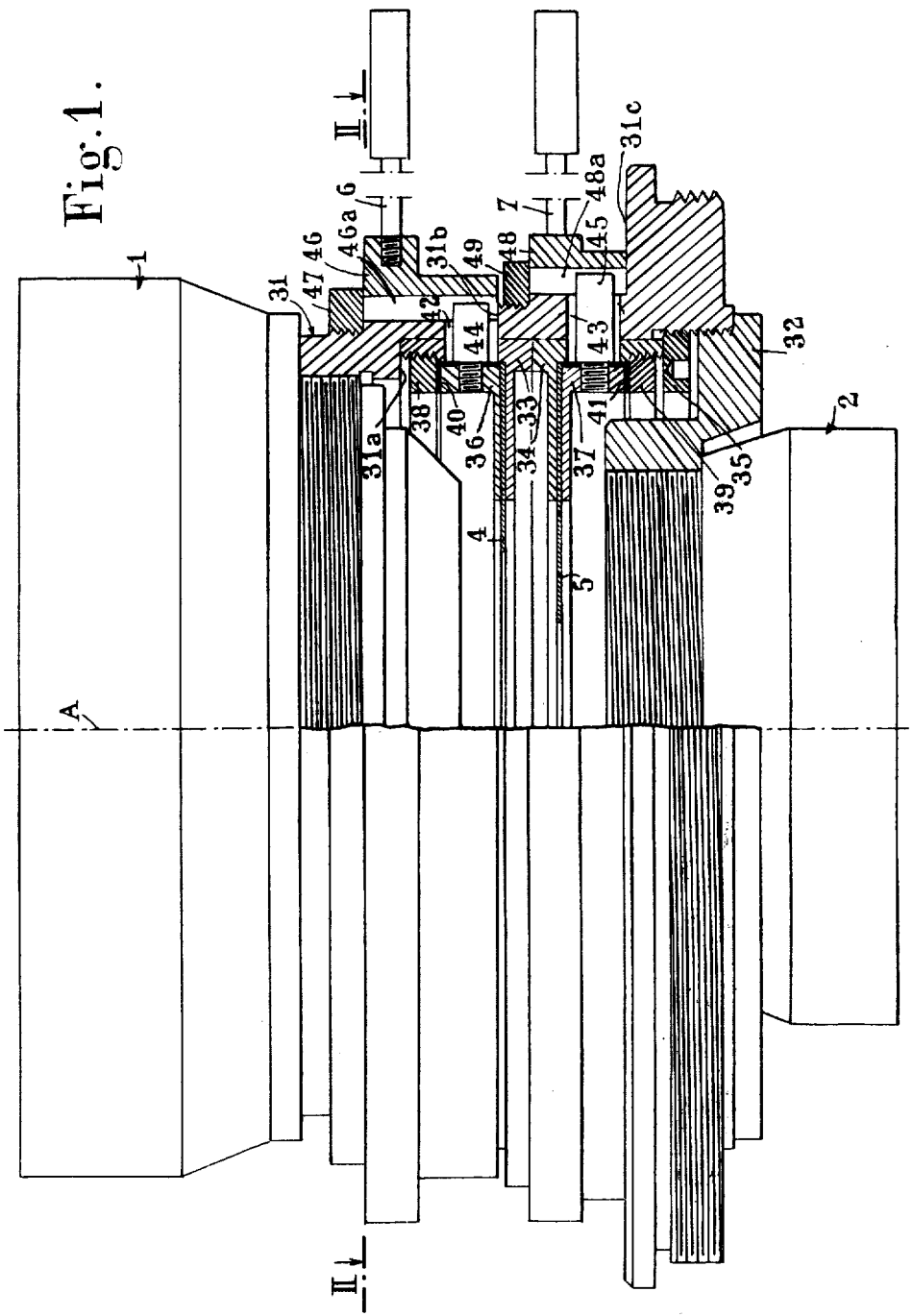
FIG. 1 is a half-section taken along an axial plane of a lens assembly according to this invention, which comprises two diaphragms and manual means for adjusting these diaphragms.
Figure 2:
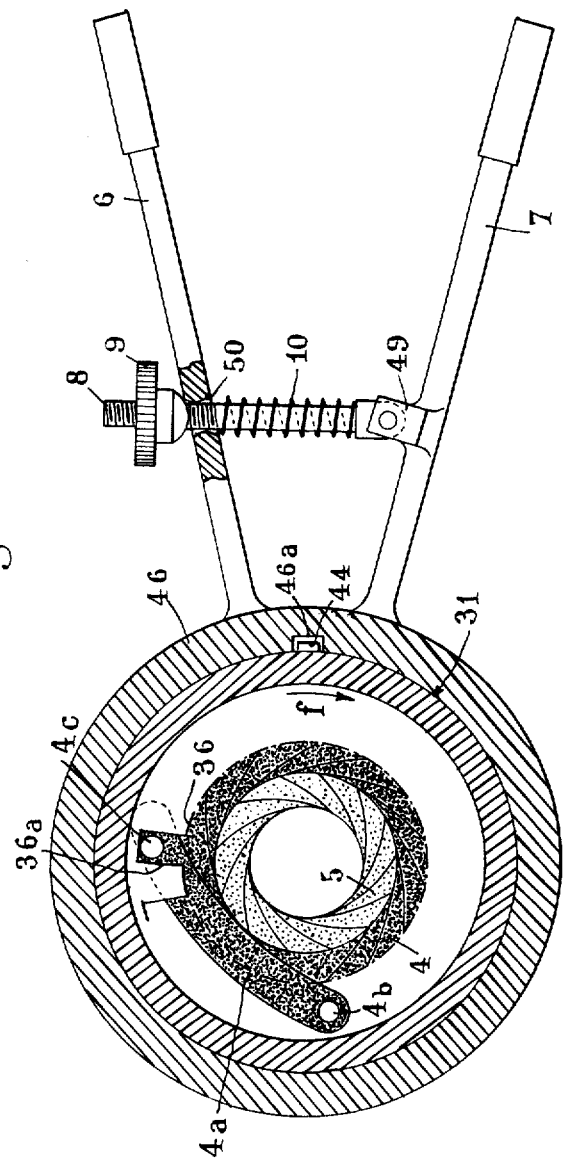
FIG. 2 is a section taken along the line II—II of FIG. 1.

The photographic lens assembly according to this invention, which is illustrated in FIGS. 1 and 2 of the attached drawings, comprises essentially a tubular mount or body 31 for example of molded metal or metal alloy; this body 31 is provided at one end with an internal-thread engaged by a rear lens barrel 1 and, at the other end with a similar internal thread engaged by a front lens barrel 2; each barrel 1, 2 is of a known type, comprising one or more lenses selected for obtaining the desired optical properties of the photographic lens assembly; these barrels 1, 2 of known type are not within the scope of this invention, and thereof a detailed description of their specific structure is not deemed necessary herein.

The following main components are mounted in superposed relationship to the tubular body 31:

A pair of shouldered ring 33 and 34 engaging each other are fitted in the middle portion of the inner cavity of the tubular body 31 and locked or fixed therein as follows: a screw ring 35, adapted to clamp the ring 34 against the ring 33, engages an internally-threaded lower portion of the tubular body. 31, thus clamping the ring 33 against a shoulder 31a formed in the upper portion of the inner cavity of said tubular body 31. A pair of variable-aperture diaphragms 4 and 5 are interposed between on the one hand the upper and lower faces of said fixed rings 33 and 34, respectively, and on the other hand the lower and upper faces of a pair of movable, internally flanged rings 36 and 37, respectively, said rings 36, 37 being fitted with a predetermined play within the fixed rings 33 and 34, respectively. The movable flanged rings 36 and 37 are locked against axial movement by other screw rings 38 and 39, respectively, engaging corresponding threaded portions formed at the ends of the fixed rings 33 and 34 which are opposite the diaphragms 4 and 5, respectively. Elements adapted to reduce the friction between the fixed and movable surfaces are interposed between the lateral outer faces and the upper or lower faces of the movable rings 36 and 37, on the one hand, and the corresponding or registering faces of the fixed rings 33, 34, 38 and 39, respectively; in FIG. 1, these elements are thin, L-sectioned metal annuli 40, 41, which are shown in thick lines in FIG. 1. The side walls of the tubular body 31 and also those of the fixed rings 33 and 34 have elongated slots 42, 43 formed circumferentially therethrough, concentrically to the axis A of the lens assembly; these circumferential slots 42, 43 have predetermined angular width; each slot 42 and 43 is engaged by a radial stud 44 or 45 having a screw-threaded end engaging a corresponding tapped hole formed in the respective movable ring 36 or 37.

The outer lateral surface of the tubular body 31 is engaged by the following components:

A ring 46 is mounted for free rotation between a first outer shoulder 31b of said tubular body 31 and a ring 47 screwed on an external thread formed on the upper portion of said body 31; this rotatable ring 46 has an internal longitudinal groove 46a formed therein and engaged by the outer end of stud 44. Similarly, a ring 48 is mounted for free rotation between a second outer shoulder 31c formed near the lower end of tubular body 31 and a ring 49 screwed on an external threaded portion of the intermediate portion of said tubular body 31; this rotatable ring 48 is also provided with an internal longitudinal groove 48a engaged by the outer end of stud 45. Manual control levers 6 and 7 have their ends screwed radially in the rotatable rings 46 and 48, respectively.

From the foregoing it is clear that, when the ring 46 or 48 is rotated by means of control lever 6 or 7, said ring 46 or 48 will cause the inner movable ring 36 or 37 to be rotated though the respective stud 44 or 45, this rotation of inner movable ring 36 or 37 resulting, according to its direction, in an increment or a reduction of the aperture of the respective diaphragm 4 or 5, as will be explained presently in detail.

Each adjustable diaphragm 4, 5 may be of any known or suitable type, of which the aperture can be adjusted by rotating the respective movable ring 36 or 37 in one or the other direction. In the specific embodiment which is shown in FIG. 2, each adjustable-aperture diaphragm 4 and 5 is of the well-known iris type, and comprises essentially a set of movable blades such as 4a (FIG. 2); each blade 4a has an elongated and slightly curved configuration; it is pivoted at 4b to the respective fixed ring 33 (not visible in FIG. 2), and it carries at its opposite end a stud 4c; the various studs such as 4c respectively engage notches, such as 36a, formed in the inner edge of the movable ring 36 (of which only a portion is shown in FIG. 2). It is clear that rotating said ring 36 by a small angle through lever 6 will cause each blade such as 4a to pivot about its pivot 4b, to the right (FIG. 1) i.e. in the clockwise direction, if the rotation is in the direction of the arrow f, thus reducing the aperture of diaphragm 4, whereas a rotation in the opposite direction causes an increment in the diaphragm aperture.

Whatever the specific structure of the pair of diaphragms 4 and 5 comprised in the lens assembly of the present invention, it is an essential feature of this invention that one of said variable-aperture diaphragms, and specially the movable blades constituting same, consists of an opaque material, whereas the other diaphragm, and specially the movable blades constituting same, consists of a translucent material; in the embodiment illustrated in FIGS. 1 and 2, it is the upper diaphragm 4 that consists of an opaque material, whereas the lower diaphragm 5 consists of a translucent material; however, this arrangement is optional and may be reversed without departing from the scope of this invention.

As shown in FIG. 2, the pair of manual control levers 6 and 7 and consequently, the movable rings 36 and 37, are rotatably coupled to each other, in such a manner that said pair of levers 6 and 7 form between them an angle adjustable within predetermined limits; this is obtained by the following means (not shown in FIG. 1): a rod 49, having possibly a square cross-section and a length corresponding substantially to the axial relative spacing of said levers 6 and 7, has one end pivotally connected to lever 7; one end of a screw rod 8 has a first end pivotally connected to the other end of said rod 49, and a second end inserted freely through a plain hole 50, formed in the intermediate portion of lever 6, in front of said square-sectioned rod 49; a compression coil spring 10 surrounds the screw rod 8 between the upper end of rod 49 and lever 6, and a nut 9 engages the free end of said screw rod 8 so as to compress the spring 10 between the pair of manual control levers 6 and 7. Under these conditions, it is clear that by changing the position of nut 9 on screw rod 8, the relative angular position of these two levers 6 and 7 can be varied between two limit positions, and that for a given position of said nut 9 on rod 8, the actuation of only one lever 6 or 7 is sufficient for simultaneously changing the respective apertures of the two diaphragms 4 and 5.

The photographic reproduction installation according to the present invention which is illustrated diagrammatically in FIG. 3, comprises a photographic camera 51 having a shutter (not shown) of a known type, providing as usual an adjustable exposure time, and a lens assembly 3 of the type illustrated in FIGS. 1 and 2, and described hereinabove. This photographic camera 51 is adapted to reproduce an object 0, for instance a photographic picture mounted on a support; the artificial light sources generally employed for illuminating the object 0 to be reproduced are not shown, since they are well known to those conversant with the art. The back of camera 51 has a frosted glass plate 52 on which the image I of the object 0 to be reproduced appears. The photographic reproduction installation shown in FIG. 3 further comprises a first photoelectric cell 13 disposed in a shade area of the image I and a second photoelectric cell 14, disposed in a light area of said image I. The currents generated by the photocells 13 and 14 respectively are transmitted through suitable conductors to the respective inputs of amplifiers 15 and 16, each of which is provided with a calibrating potentiometer, as shown diagrammatically at 17 and 18; the output currents of amplifiers 15 and 16 are fed through other conductors to the respective inputs of suitable measuring instruments 19 and 20 of known type, each of which is provided preferably with an index needle movable on a graduated dial having a mid zero (mid-zero instrument).

Figure 3:
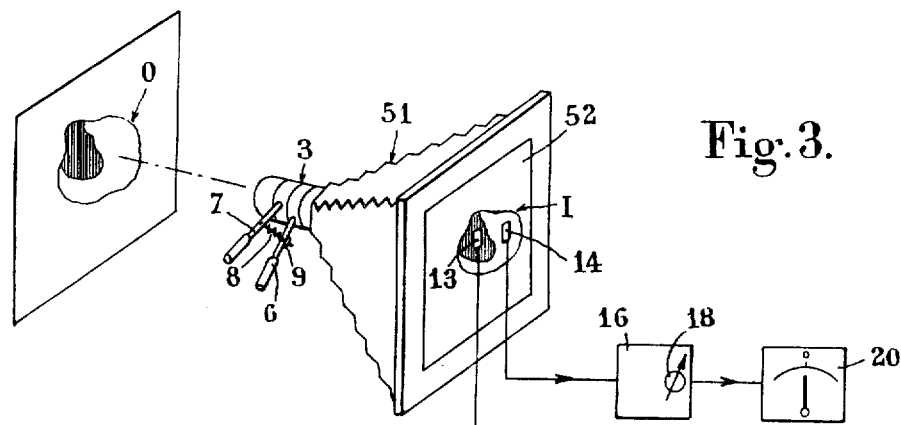
FIG. 3 is a diagrammatic and perspective view of a photographic reproduction installation according to this invention, which comprises a photographic reproduction apparatus equipped with a lens assembly of the type shown in FIGS. 1 and 2.

The photographic reproduction installation which is illustrated diagrammatically in FIG. 3, is operated as follows; firstly, the operator adjusts the contrast of the image I of the object 0 to be reproduced by the following procedure:

1. The shutter of camera 51 being permanently open, the operator rotates the adjustment nut 9 on screw rod 8 interconnecting the pair of levers 6 and 7 for controlling the respective apertures of the diaphragms in lens assembly 3 so that these diaphragms have same apertures; then, only one of the coupled levers 6, 7 is actuated by the operator for simultaneously varying the equal apertures of the two diaphragms in a suitable direction to cause the index of measuring instrument 20 (associated with photocell 14, disposed in a light area of the object image I) to approach the zero of said measuring instrument 20 and remain thereat.

2. Then the operator rotates said nut 9 of rod 8 to move lever 6 and thus open the opaque diaphragm 4 so that its aperture becomes greater than that of the translucent diaphragm 5, as shown in FIG. 2; this increment in the aperture of the opaque diaphragm 4 is continued until the index of the measuring instrument 19 (associated with photoelectric cell 13, disposed in a shade area of the object image I) is brought in its zero position on the dial of said measuring instrument; under these conditions, the operator will notice that, at the same time, the index of the other measuring instrument 20 moved away from its zero position.

3. Subsequently, the operator actuates only one of the pair of coupled levers 6 and 7 for changing again the apertures of both diaphragms 4 and 5 in such a direction and with such an amplitude that the index of the measuring instrument 20, associated with the light area of image 1, is restored to its zero position: this causes the index of the other measuring instrument 19 to move again away from its zero position, but with a lesser ampliltude than before.

4. The above-described operations are repeated in succession by the operator until both indices of the measuring instruments 19 and 20 suubstantially register with their zero positions.

Then the operator replaces the frosted glass plate 52 of photographic camera 51 by a photosensitive plate, on which the image I is recorded by opening the shutter of this camera during a properly predetermined exposure time.

The photographic reproduction installation illustrated in FIG. 3 must be re-calibrated each time a change is brought into at least one of its essential features, notably the lens assembly 3, the sensitivity of the photosensitive plate, the plate exposure time, and the screen possibly utilized for obtaining a half-tone photographic image of the object; this re-calibration is accomplished as follows: a reference photograph is used as the object to be reproduced; while maintaining the shutter of camera 51 open, a permanent image of said reference photograph appears on the frosted glass plate 52, as illustrated in FIG. 3; then the operator adjusts the calibrating potentiometers 17 and 18 of amplifiers 15 and 16 so that the respective indices of measuring instruments 19 and 20 are zeroed.

Of course, the use of measuring instruments 19 and 20 having a mid-zero position is not an essential feature of this invention; it is only necessary that, during the above-described re-calibration operation, the operator adjusts the potentiometers 17 and 18 so that the indices of the measuring instruments 19 and 20 associated therewith stop in front of graduation lines located centrally of the respective dials; then the operator marks these graduation lines, which are to be used in place of said mid-zeroes during the above described procedure for contrast adjustment.

Figure 4:
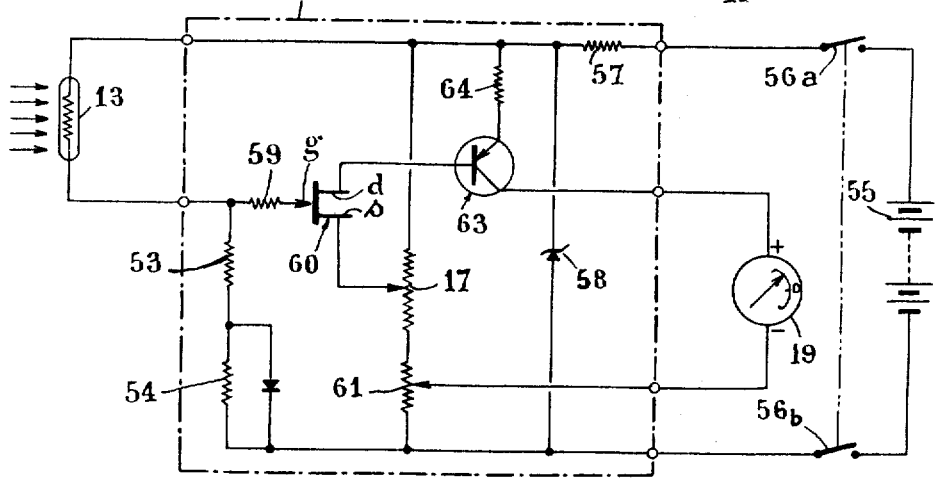
FIG. 4 is a wiring diagram of a typical embodiment of one part of the installation illustrated in FIG. 3.

FIG. 4 is a wiring diagram of a plain rugged and compact embodiment of amplifier 15 comprised in the installation shown in FIG. 3; amplifier 16 may be constructed in the same fashion. In this embodiment, the photocell 13 consists of a photoresistor, which is connected, in series with a pair of fixed resistors 53 and 54, to an electric battery 55, through a double-pole single throw switch 56a–56b; another fixed resistor 57, connected in series with one terminal of battery 55, and a Zener diode 58, connected in parallel therewith, are provided for regulating the electric voltage supplied by this battery. The voltage available at the terminal of photoresistor 13 connected to resistor 53 is fed through an fixed resistor 59 to the gate $g$ of a field effect transistor 60; the source s of transistor 60 is biased from the calibrating potentiometer 17 which is connected in series with another adjusting potentiometer 61, both potentiometers 17 and 61 being in parallel with the Zener diode 58. The drain $d$ of the field effect transistor 60 is connected to the base of a p-n-p transistor 63, having its emitter connected, through another fixed resistor 64, to the regulating resistor 57. The measuring instrument 19 is connected with a suitable polarity between the collector of transistor 63, on the one hand, and the sliding contact of the adjusting potentiometer 61, on the other hand.

The gain of amplifier 15 is adjustable by means of said calibrating potentiometer 17, between limits determined by the potentiometer 61; these components are so dimensioned that the index of the measuring instrument 19 can be brought to its mid-zero position, by adjusting the potentiometer 17, for all the contemplated combinations of the above-mentioned features of this photographic reproduction installation.

Figure 5:
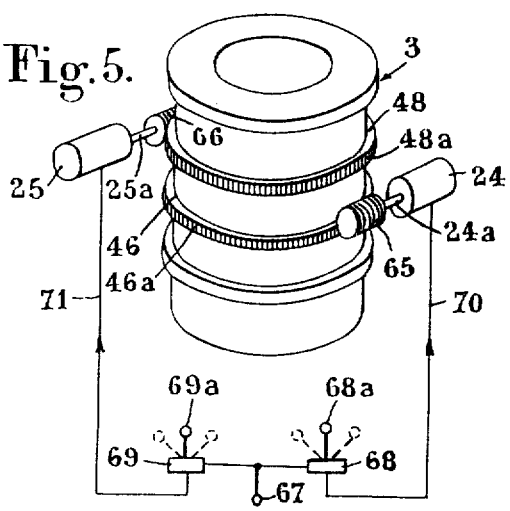
FIG. 5 illustrates diagrammatically in perspective view a lens assembly according to this invention, provided with a pair of diaphragms and with means for the manual remote control of the diaphragm aperture.

FIG. 5 illustrates an improvement to the photographic reproduction installation shown in FIG. 3; in this FIG. 5, only the lens assembly 3 is shown, on a larger scale; this lens assembly may have exactly the structure shown in FIGS. 1 and 2, except that the pair of rotatable outer rings 46 and 48 are each provided with a circular set of teeth 46a or 48a, meshing with worms 65 and 66, respectively; each worm 65, 66 is rigid with one end of the shaft 24a or 25a of a reversible electric motor 24 or 25, i.e. a motor adapted to be energized for rotation in either direction; the pair of motors 24 and 25 is supported adjacent the lens assembly 3 of the photographic camera (51 in FIG. 3) through any suitable means (not shown), the nature of which will readily occur to those skilled in the art. Each electric motor 24, 25 is energized from a suitable source of electric current (not shown), which is connected to a terminal 67, through manual control switches 68, 69 and supply lines 70 and 71, respectively. Each manual control switch 68, 69 comprises a control member or lever 68a, 69a adapted to be brought selectively in anyone of three stable positions, namely a intermediate position (shown in thick lines in FIG. 5) corresponding to the de-energization of the respective motor, and two end positions, on eithe side of said intermediate position (and shown in dash lines in FIG. 5), in which the respective motor is fed with current of such polarity that it rotates in one or the other direction.

Figure 6:
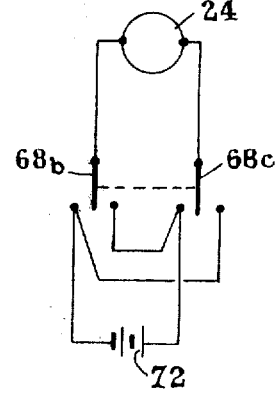
FIG. 6 is the wiring diaphragm of the electric supply circuit for one of the two remote control motors of FIG. 5.

FIG. 6 illustrates diagrammatically a typical embodiment of an electric circuit for supplying energizing current to motor 24 of FIG. 5; a similar circuit may be used for energizing the other motor 25 (FIG. 5); this supply circuit comprises, as a source of electric current, an electric battery 72, connected in the manner illustrated to the fixed contact studs of a manually operated double-pole, double-throw switch 68, of which the two movable contact members 68b and 68c are connected to the terminals of motor 24; in this case, the motor 24 is of course a d.c. motor, of which the direction of rotation changes according as the movable contact members 68b and 68c of switch 68 engage the respective right-hand fixed contact studs or the respective left-hand fixed contact studs of said switch; in the intermediate position of movable contacts 68b and 68c, illustrated in FIG. 6, the electric motor 24 is not energized.

It is thus clear that, if the photographic reproduction installation shown in FIG. 3 is completed as shown in FIG. 5, the operator can adjust the image contrast by the above-described procedure or method of the present invention, that is by actuating in succession and alternatively the manual switches 68 and 69 so as to energize the motors 24 and 25 each time in the proper direction, and thus to change the respective apertures of diaphragm 4 (through the toothed ring 46) and diaphragm 5 (through the toothed ring 48) in order to restore the index of each measuring instrument 19 or 20 to its zero position.

The remote control system for adjusting the diaphragm apertures, which is illustrated diagrammatically in FIG. 5, is particularlry advantageous in that it permits of placing the measuring instruments 19 and 20 remote from the camera, whereas in the embodiment illustrated in FIG. 3, both instruments 19, 20 must compulsorily be disposed within the proper reading distance from the operator for enabling the same to control the manual levers 6 and 7 of lens assembly 3. Moreover, the electric control means for adjusting the diaphragm apertures which are shown in FIG. 5 permits of reducing considerably the contrast adjustment time, in comparison with the purely manual diaphragm adjustment performed with the installation of FIG. 3. With the remote control system of FIG. 5 it is no longer necessary to have a direct access to the lens assembly 3 of the photographic camera; this is a feature particularly advantageous in the case of enlargers and reproduction apparatus or benches in which the lens assembly is scarcely accessible due to the relatively great distance between the projection plane and the lens assembly, or when this installation is placed in a laboratory room.

Figure 7:
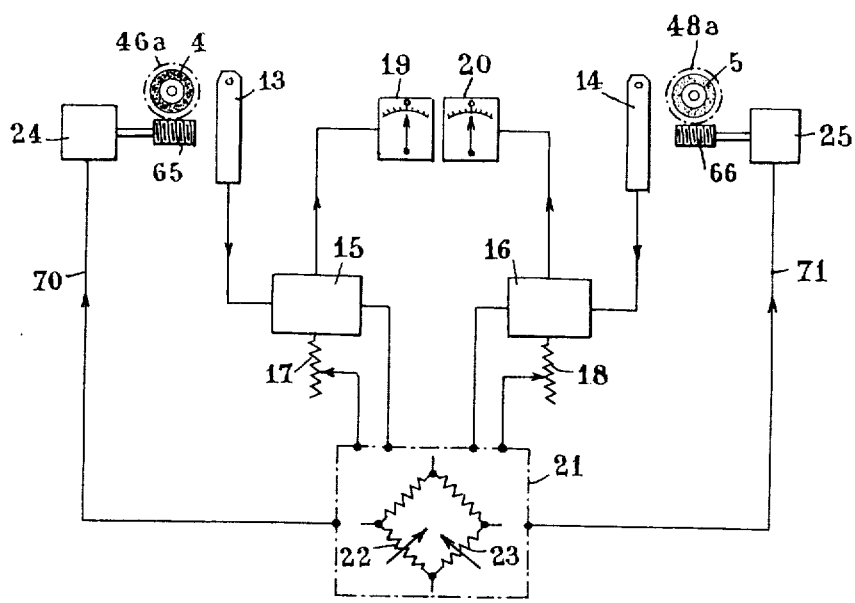
FIG. 7 is the block diagram of an automatically operated photographic reproduction installation according to this invention, and specially of its control unit for automatically controlling the aperture of the two diaphragms.

FIG. 7 is the block diagram of another embodiment of the photographic reproduction installation according to the present invention, which is illustrated in FIG. 3. This embodiment permits of rendering fully automatic the contrast adjustment for the image I (FIG. 3); in other words, this embodiment eliminates all manual operations in the above-described adjustment method, thus further reducing appreciably the time necessary therefor.

In FIG. 7, the photographic camera (51, FIG. 3) and lens assembly (3) are not shown; only the two diaphragms 4 and 5 of this lens assembly (3) are illustrated diagrammatically in FIG. 7, together with the toothed rings 46a and 48a formed on their adjustment rings (46 and 48 in FIG. 1); as shown in FIG. 5 worms 65 and 66 are meshing with these toothed rings 46a and 48a respectively, said worms 65, 66 being rigid with the respective shafts of a pair of separate electric motors 24 and 25 of the reversible type. The pair of photocells 13 and 14, which are to be disposed as shown in FIG. 3, are connected to the first inputs of amplifiers 15 and 16 which may be similar to the amplifiers 15 and 16 of FIG. 3; the first outputs of these amplifiers 15, 16 are connected directly to the mid-zero instruments 19 and 20, respectively; the second outputs of amplifiers 15 and 16 and also the sliding contacts of the calibrating potentiometers 17 and 18, which are associated with said amplifiers 15 and 16, respectively, as already described with reference to FIG. 3, are connected to the inputs of a circuit 21, comprising at least one Wheatstone bridge having two potentiometric arms 22 and 23; the outputs of said circuit 21 are connected to the energizing terminals of motors 24 and 25 through conductors 70 and 71, respectively.

Figure 8:
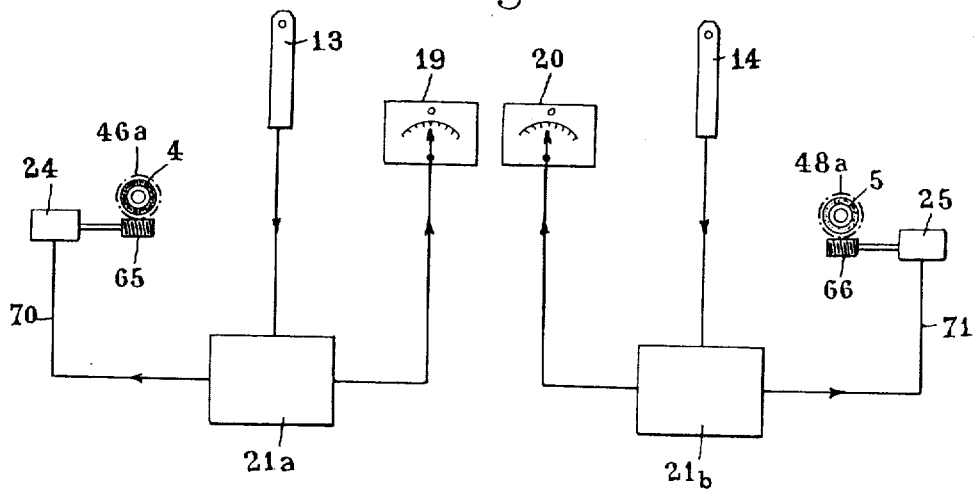
FIG. 8 illustrates an embodiment of the control unit of FIG. 7.
Figure 9:
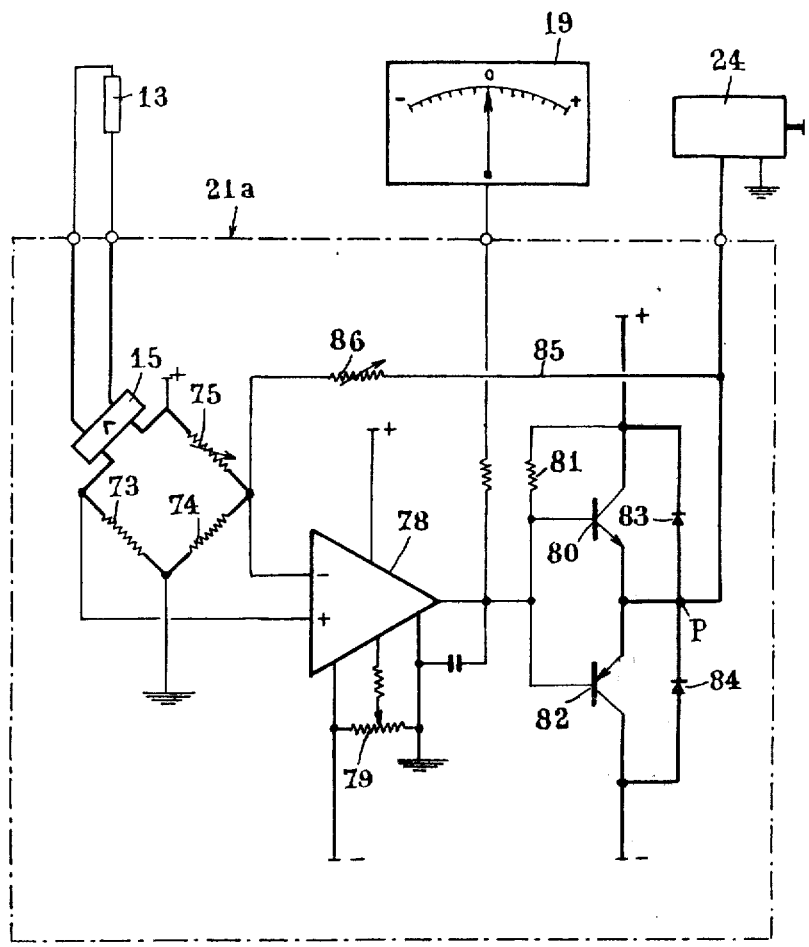
FIG. 9 is a wiring diagram of one part of the control unit of FIG. 8.

FIG. 8 illustrates an embodiment of the installation shown in FIG. 7, wherein the same reference numerals designate the same or similar components; the installation shown in FIG. 8 comprises two Wheatstone bridge circuits 21a and 21b; these circuits 21a, 21b are associated respectively the former 21a with photocell 13 and electric motor 24, the latter 21b with photocell 14 and electric motor 25; each circuit 21a, 21b may be constituted as shown by way of example in FIG. 9, in which the same reference numerals as in FIG. 8 are also used.

The electric circuit 21a illustrated in FIG. 9 comprises firstly a Wheatstone bridge consisting essentially of a pair of fixed ohmic resistors 73, 74 and of an adjustable calibrating resistor 75; the fourth arm of the Wheatstone bridge consists of the photoresistor, constituting the photocell 13; a pre-amplifier 15 is inserted optionally between this photoresistor 13 and the corresponding arm of the Wheatstone bridge. The opposite ends of the fixed resistors 73 and 74 are connected to the inputs of a differential amplifier 78, consisting for example of an integrated circuit or solid-state circuit of any known and suitable type, to which a positive biasing voltage (+) and a negative biasing voltage (−) are fed; the gain of this differential amplifier 78 is adjustable by means of a potentiometer 79 inserted between the negative biasing source (−) and the ground. The output of the differential amplifier 78 is connected on the one hand to the input of the mid-zero instrument 19, and on the other hand to the input of a switching and power amplifying unit, comprising essentially an n-p-n transistor 80, a p-n-p transistor 82 and a pair of diodes 83 and 84, which are mounted in series between the positive (+) and negative (−) terminals of a biasing voltage source (not shown), so that said diodes 83 and 84 are biased in opposite directions and normally non-conducting; the emitters of both transistors 80 and 82 are connected to the common point P of diodes 83 and 84, and their collectors are connected to said (+) and (−) terminals, respectively; a biasing resistor 81 is inserted between the base and collector of transistor 80; the interconnected bases of both transistors 80 and 82 are further connected to the output of differential amplifier 78, and the commone point P of said diodes 83, 84 and of the emitters of transistors 80 and 82 is connected to the first energizing terminal of electric motor 24, having its second terminal grounded. This last mentioned common point P is also connected to one input of differential amplifier 78 through a feed-back line 85, in which an adjustable resistor 86 is inserted.

The installation illustrated in FIGS. 8 and 9 operates as follows:

The pair of photocells 13 and 14 being disposed as shown in FIG. 3, if the contrast of the image I of the object 0 to be reproduced differs from the contrast for which the installation was previously calibrated at least one of the respective Wheatstone bridges of both circuits 21a and 21b is unbalanced; supposing that Wheatstone bridge of circuit 21a is unbalanced a d.c. voltage is applied across the input terminals of the differential amplifier 78 (FIG. 9) the polarity of this d.c. voltage depending on the direction of said Wheatstone bridge unbalance and, therefore, on the real illumination in the shade area of image I being either superior or inferior to the rated value of this illumination. The output voltage of said differential amplifier 78 is displayed by the measuring instrument 19, is proportional to the discrepancy or difference between said real illumination and its rated value. If the output voltage of differential amplifier 78 is positive — this corresponding for example to a positive value of the aforesaid discrepancy — transistor 80 will become conducting so that a positive voltage, generally inferior to that available on said (+) terminal, is fed to the first terminal of motor 24; thus, this motor 24 will start rotating in a suitable direction to vary the aperture of the opaque diaphragm 4 in such a direction as to reduce said discrepancy between the real illumination in the shade area of image I and the rated value of this illumination; this automatic adjustment of the aperture of diaphragm 4 is continued until the above-mentioned discrepancy or difference is cancelled, this desired result being observed through the return of the index of measuring instrument 19 to its mid-zero position; simultaneously transistor 80 is brought to non-conducting condition, and the motor 24 is de-energized. Of course, if the illumination discrepancy or difference is negative, a negative voltage will appear on the output terminal of differential amplifier 78, thus rendering conductive the transistor 82, whereby the motor 24 is energized with a negative voltage, so that the aperture of diaphragm 4 is caused to vary in the opposite direction. Both diodes 83 and 84 are intended to protect transistors 80, 82 against voltage surges originating from the inductive winding of motor 24.

The automatic adjustment of the illumination in the light areas of image I, is obtained through the co-operation of photocell 14, circuit 21b and motor 25, controlling the aperture of the translucent diaphragm 5, just in the same fashion as described hereinabove with reference to the opaque diaphragm 4.

The installation illustrated in FIGS. 8 and 9 may be calibrated whenever necessary by the method described hereinabove with reference to the installation of FIG. 3; to this end, a reference photograph is used and the calibrating resistor 75 (FIG. 9) is manually adjusted in each circuit 21a, 21b so as to zero the index of the respective measuring instrument 19 or 20.

Although specific embodiments of this invention have been shown and described herein, it will readily occur to those conversant with the art that various modifications and changes may be brought thereto in actual practice without departing from the basic principles of the invention as set forth in the appended claims.

What is claimed as new is:

1. Method of photographically reproducing an object, which comprises the following successive steps:
    a. forming a luminous reproduction beam propagating from the object in a predetermined direction;
    b. concentrating said light beam onto a plane surface disposed across said predetermined direction so as to form an image of said object thereon;
    c. stopping the propagation of said light beam outside a first closed contour disposed across said predetermined direction, and encompassing a first predetermined area;
    d. diffusing the portion of said light beam which passes between said first closed contour and a second closed contour disposed internally of the first one and encompassing a second predetermined area;
    e. varying simultaneously and in the same direction said first and second coutour areas respectively;
    f. measuring the illumination of the light areas of said object image;
    g. varying only said first contour area;
    h. measuring the illumination of the shade areas of said object image;
    i. repeating steps (e) to (h) until the illuminations measured in the light and shade areas of the image have predetermined values.
    j. photographing the image of said object.

2. Photographic reproduction installation comprising a reproduction apparatus equipped with a lens assembly, comprising a mount and, in said mount, at least one projection lens, a first variable-aperture diaphragm of opaque material and a second variable-aperture diaphragm of translucent material, said first and second diaphragms being disposed tandemwise in said mount in the optical field of said lens, and first and second means disposed on said mount for adjusting from the exterior the apertures of said first and second diaphragms, respectively, first and second photometers, disposed in one light area and one shade area of the image of the object to be reproduced, respectively, first and second power members for actuating said first and second means for adjusting the lens assembly diaphragm apertures, and first and second hand switchable electric means for selectively energizing said first and second power members, respectively.

3. Photographic reproduction installation comprising a reproduction apparatus equipped with a lens assembly, comprising a mount and, in said mount, at least one projection lens, a first variable-aperture diaphragm of opaque material and a second variable-aperture diaphragm of translucent material, said first and second diaphragms being disposed tandemwise in said mount in the optical field of said lens, and first and second means disposed on said mount for adjusting from the exterior the apertures of said first and second diaphragms, respectively, first and second photometers, disposed in one light area and one shade area of the image of the object to be reproduced, respectively, first and second power members for actuating said first and second means for adjusting the lens assembly diaphragm apertures, and electric means for energizing said first and second power members as long as the output signal of at least one of said first and second photometers departs from a predetermined value.

4. Installation as set forth in claim 3, wherein said electric means for energising said power members comprises at least one Wheatstone bridge having two potentiometric arms, said bridge having input terminals connected to said photometers and output terminals connected to said power members.

5. Installation as set forth in claim 3, wherein said electric means for energizing said power members comprises a first and a second Wheatstone bridge, each having a potentiometric arm and another arm connected to said first or second photometer, a first and a second differential amplifier having input terminals connected to said first and second bridges, respectively, and output terminals connected to said first and second power members, respectively.

* * * * *